(12) United States Patent
Santini

(10) Patent No.: US 6,301,084 B1
(45) Date of Patent: Oct. 9, 2001

(54) PROTECTION OF SECOND POLE TIP DURING FABRICATION OF WRITE HEAD

(75) Inventor: Hugo Alberto Emilio Santini, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/316,774

(22) Filed: May 21, 1999

(51) Int. Cl.[7] .............................. G11B 5/187; G11B 5/39
(52) U.S. Cl. ................................ 360/317; 29/603.14
(58) Field of Search ........................... 360/317, 119, 360/122, 125, 126; 29/603.01, 603.07, 603.14, 603.15, 603.18, 603.22, 603.13; 427/116, 130, 131, 132

(56) References Cited

U.S. PATENT DOCUMENTS

| | | | |
|---|---|---|---|
| 5,283,942 | * 2/1994 | Chen et al. | 29/603.13 |
| 5,452,164 | * 9/1995 | Cole et al. | 360/126 |
| 5,867,890 | * 2/1999 | Hsiao et al. | 29/603.14 |
| 5,966,800 | * 10/1999 | Huai et al. | 29/603.13 |
| 6,018,862 | * 2/2000 | Stageberg et al. | 29/603.14 |
| 6,033,580 | * 3/2000 | Shouji et al. | 216/22 |
| 6,085,406 | * 7/2000 | Garfunkel et al. | 29/603.14 |
| 6,105,238 | * 8/2000 | Chesnutt et al. | 29/603.14 |

* cited by examiner

Primary Examiner—David L. Ometz
(74) Attorney, Agent, or Firm—Gray Cary Ware & Freidenrich; Ervin F. Johnston

(57) ABSTRACT

A dielectric protection layer is formed on the top and first and second side walls of a second pole tip portion of a second pole piece layer for preventing alteration of the track width of the second pole tip portion during subsequent fabrication of metallic components of the write head, such as a write coil, terminal leads to a read sensor and the write coil and studs to the terminal leads.

14 Claims, 11 Drawing Sheets

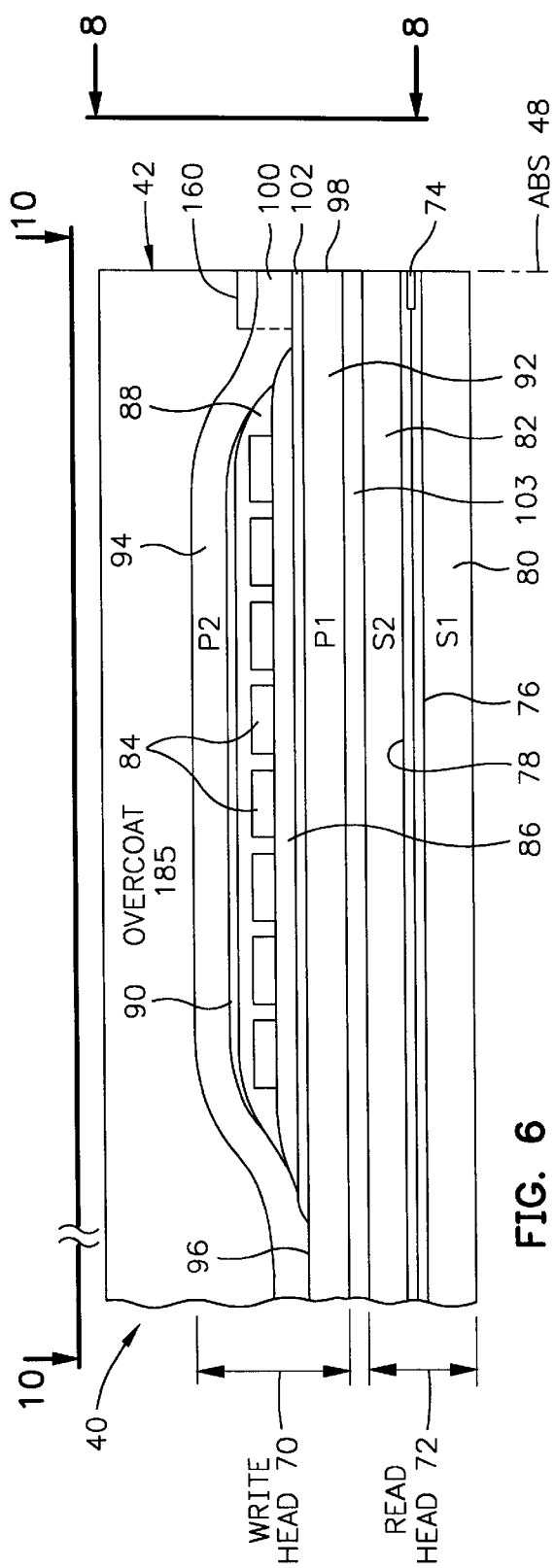
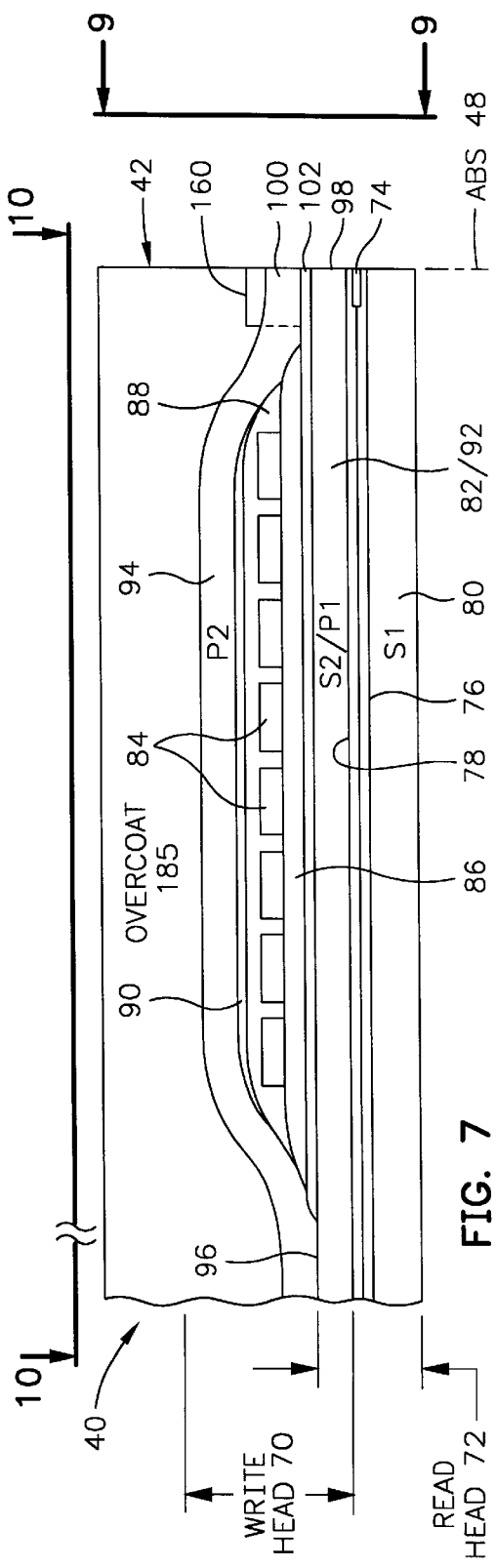
FIG. 6
FIG. 7

(ABS)

PROTECTION OF SECOND POLE TIP DURING FABRICATION OF WRITE HEAD

BACKGROUND OF THE INVENTION

1. Field of the Invention

The present invention relates to protection of a second pole tip during fabrication of a write head and more particularly to protection of a track width defined by first and second side walls and the thickness of the second pole tip during construction of metallic components of the write head such as lead layers and studs.

2. Description of the Related Art

The heart of a computer is an assembly that is referred to as a magnetic disk drive. The magnetic disk drive includes a rotating magnetic disk, a slider with read and write heads which is supported by a suspension arm above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic bits to and reading magnetic bits from the rotating disk. The read and write heads are connected to processing circuitry that operates according to a computer program to implement the writing and reading functions.

The write head includes a write coil layer embedded in first, second and third insulation layers (insulation stack), the insulation stack being sandwiched between first and second pole piece layers. A gap is formed between the first and second pole piece layers by a nonmagnetic gap layer at an air bearing surface (ABS) of the write head. The pole layers are connected at a back gap. A write current conducted to the write coil layer induces a magnetic field into the pole pieces that fringes across the gap between the pole pieces at the ABS. The fringe field writes information in tracks on moving media, such as in circular tracks on a rotating disk. First ends of first and second leads are connected to the write coil and second ends of the first and second leads are connected to first and second studs that are exposed at a surface of the slider for connection to a source for producing the aforementioned write current.

The read head includes a sensor for sensing signal fields from the rotating magnetic disk. The signal fields from the rotating disk cause changes in the resistance of the sensor. First and second leads are connected to the sensor for conducting a sense current through the sensor so that the resistance changes cause potential changes in a sense current circuit which can be processed as playback signals. The sensor and the first and second leads are located between first and second read gap layers. The first and second read gap layers are located between first and second shield layers in a piggyback head or between a first shield layer and a common second shield first pole piece layer in a merged magnetic head. The first and second leads of the sensor are connected to terminal leads which are, in turn, connected to studs that are exposed at the surface of the slider for connection to a source for producing the aforementioned sense current.

There are two types of magnetic write heads, one of these heads being a standard write head and the other being a stitched write head. In the standard write head the second pole piece is a single layer whereas in the stitched write head the second pole piece comprises first and second layers. The first layer is located in a pole tip region of the head and the second layer is located in yoke and back gap regions of the head. The pole tip region is defined as the region between the ABS and a flare point (point at which the second pole piece first commences to widen after the ABS), the back gap region where the second pole piece is connected to the first pole piece and the yoke region which is located between the flare point and the back gap. In the stitched head a bottom portion of the yoke portion of the second pole piece layer is connected to a top portion of the pole tip portion of the second pole piece layer. In the standard head the second pole piece layer is constructed after formation of the insulation stack with one or more coil layers embedded therein and in the stitched head the insulation stack with one or more coil layers embedded therein is constructed after construction of the pole tip portion of the second pole piece layer. The yoke and back gap portions of the second pole piece layer are then constructed after construction of the insulation stack. One advantage of the stitched head is that the second pole tip portion can be constructed by photolithographic techniques without reflective notching from a seed layer on the insulation stack since the second pole tip portion is constructed before the insulation stack.

Research efforts are still intense for increasing the storage capacity of magnetic disk drives. The product of track width density and linear bit density equals areal density which is quantified in bits per square inch of the magnetic medium. Linear bit density is the number of bits per inch along a length of the track whereas track width density is the number of tracks written per inch along a width of the magnetic medium. Because of the directional rotation of the magnetic disk the second pole tip portion is the last pole tip to pass by the rotating track. Accordingly, the distance between the first and second side walls of the second pole tip portion determines the track width density of the write head. Efforts are now submicron track widths. It is expected with a track width of 0.75 $\mu$m the areal density will be 10 gigabits per square inch, a track width of 0.5 $\mu$m will provide an areal density of 20 gigabits per square inch and a track width of 0.29 $\mu$m will provide an areal density of 40 gigabits per square inch. As the track width gets smaller the standard deviation or sigma ($\sigma$) must also be smaller. The sigma is dependent upon many factors such as the photolithographic techniques employed for fabricating the second pole tip portion. In photolithographic patterning a layer of photoresist, the photoresist layer is spun on the wafer, the photoresist layer is exposed to light in areas where the photoresist is to be removed (assuming the photoresist is a positive photoresist), the photoresist layer is subjected to a developer which removes the photoresist exposed to the light, a write head component is then electroplated in the opening of the photoresist, and the photoresist is removed by a stripper. The accuracy of the track width of the second pole piece portion made by this technique depends upon the accuracy of the alignment marks on the wafer, uniformity of the resist coating, focal plane of the photo tool exposing the photoresist to light, uniformity of the illumination of the light and uniformity of development of the photoresist after being exposed to the light. The sigma is also dependent upon the degree of alteration of the first and second side walls by subsequent processing steps such as fabrication of metallic components of the write head, which will be discussed in more detail hereinafter. An existing goal is that the 3 sigma be no more than 10% of the designed track width. For instance, for a 40 gigabit density write head the 3 sigma should be no more than 30 Å which is approximately 10% of a track width of 0.29 µm. As indicated hereinabove, the metallic components of the write head are made by electroplating. The metallic components of the write head are the first pole piece layer, the coil layer, terminal leads to the write coil layer, leads to a read sensor, when the write head is combined with a read head, terminal leads to the read sensor leads and studs to the terminal leads which are exposed at a surface of the head assembly for connection to processing circuitry. All of these metallic components are constructed with photolithographic patterning. Before the photolithographic patterning, however, a seed layer of copper (Cu) is sputter deposited on the wafer to provide a return path for the electroplating. Before the seed layer is sputter deposited the wafer is sputter etched so that the wafer and all exposed components thereon have a clean surface for the seed layer. After the photolithographic construction the photoresist is removed, as described hereinabove, and the wafer is ion milled to remove all of the exposed seed layer.

Unfortunately, the aforementioned sputter etching and ion milling steps can seriously alter the track width of the second pole tip portion of the second pole piece layer. While the sputter etch cleans the surface of the wafer for the seed layer it also removes a portion of the first and second side walls of the second pole tip layer, reducing its track width as well as some of the thickness of the second pole tip layer. When ion milling is employed to remove the exposed seed layer after photopatterning of a metallic component the ion milling also removes a portion of the first and second side walls of the second pole tip portion to further reduce the track width as well as more of the thickness of the second pole tip layer. Ion milling also has a second negative aspect on the second pole tip. As the copper (Cu) seed layer is being removed by ion milling a portion of the copper (Cu) is deposited on the first and second side walls of the second pole tip which is referred to in the art as redeposition or redep. Since this redeposition is copper (Cu) it will be exposed at the ABS when the ABS is formed by lapping which is a grinding process. Unfortunately, the copper (Cu) and nickel iron (NiFe) of the pole pieces set up a galvanic cell which can cause serious corrosion of the sensitive elements of the write head at the ABS. This corrosion can destroy the write head.

Metallic components constructed after the construction the second pole piece layer in a standard head are terminal leads and studs, whereas metallic components constructed after construction of the second pole tip portion of the second piece layer in a stitched head are the write coil layer, the terminal leads and the studs. Accordingly, the pole tip portion of a stitched head is subjected to more alteration than a standard head.

SUMMARY OF THE INVENTION

The present invention provides a method and a write head wherein the track width of the second pole tip portion of the second pole piece layer is protected from alteration during the fabrication of subsequent metallic components of the write head. This has been accomplished by covering the second pole tip portion with a thin layer of dielectric, such as alumina ($Al_2O_3$), or silicon (Si) or silicon oxide ($Si_2O_3$). The protective dielectric prevents the standard head from sputter etching, ion milling and redeposition during fabrication of terminal leads and studs and the dielectric covering protects the second pole tip portion in a stitched head from sputter etching, ion milling and redeposition during construction of the coil layer, terminal leads and studs. In the stitched write head the protective dielectric may also extend into the yoke region of the head to serve as a first insulation layer of the insulation stack.

An object of the present invention is to prevent alteration of the track width of a second pole tip portion of a second pole piece layer during construction of subsequent metallic components of the write head.

Another object is to preserve the plated thickness of the pole tips so that they will not have to be made thicker, thereby creating high aspect ratio lithography problems.

A further object is to provide a magnetic write head wherein a protective layer for a second pole piece portion of a second pole piece layer is employed for protecting the track width of the second pole tip portion as well as providing a first insulation layer of an insulation stack in a yoke region of the write head.

Other objects and advantages of the present invention will become apparent upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
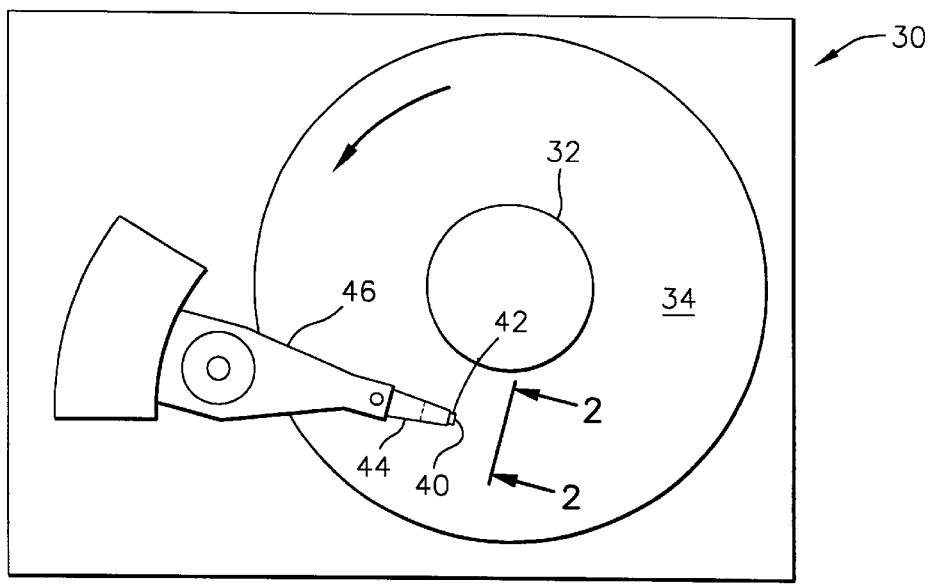
FIG. 1 is a plan view of an exemplary magnetic disk drive.
Figure 2:
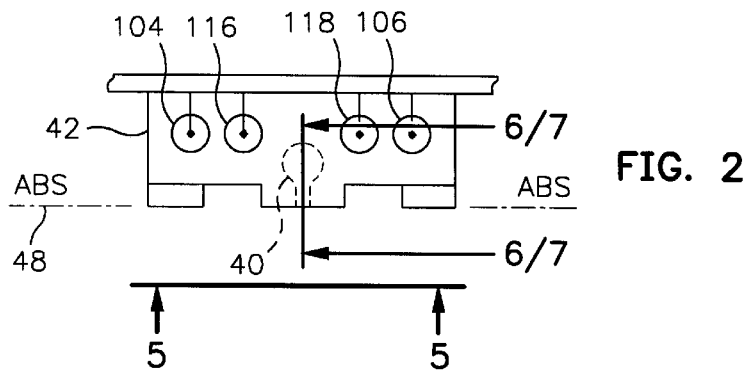
FIG. 2 is an end view of a slider with a magnetic head of the disk drive as seen in plane 2—2.
Figure 3:
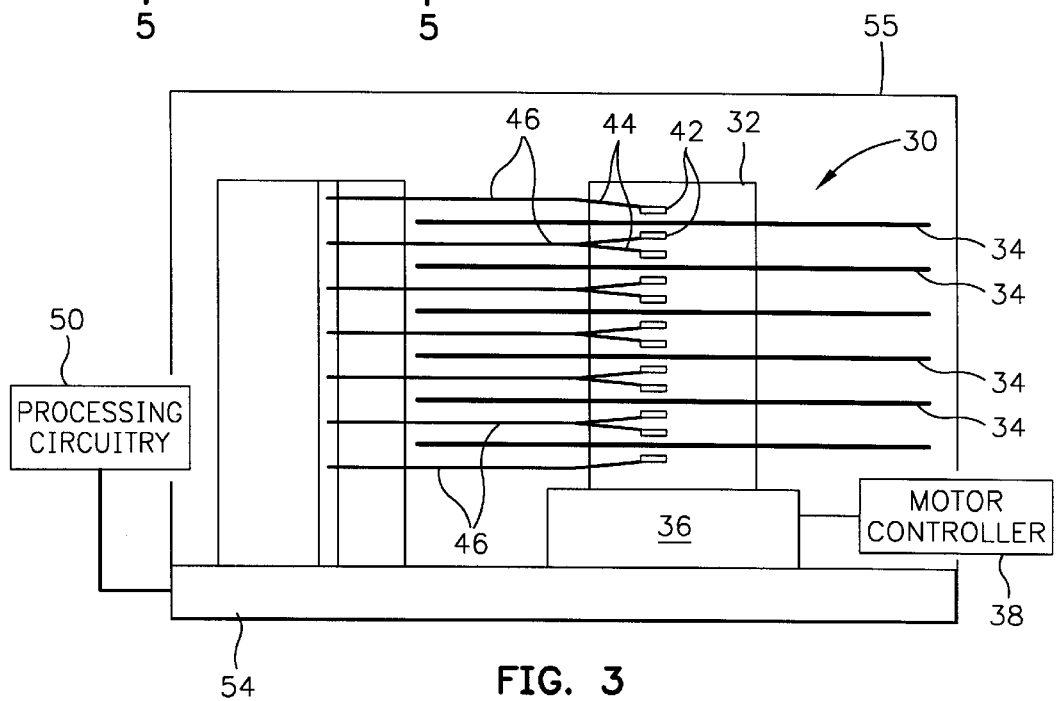
FIG. 3 is an elevation view of the magnetic disk drive wherein multiple disks and magnetic heads are employed.
Figure 4:
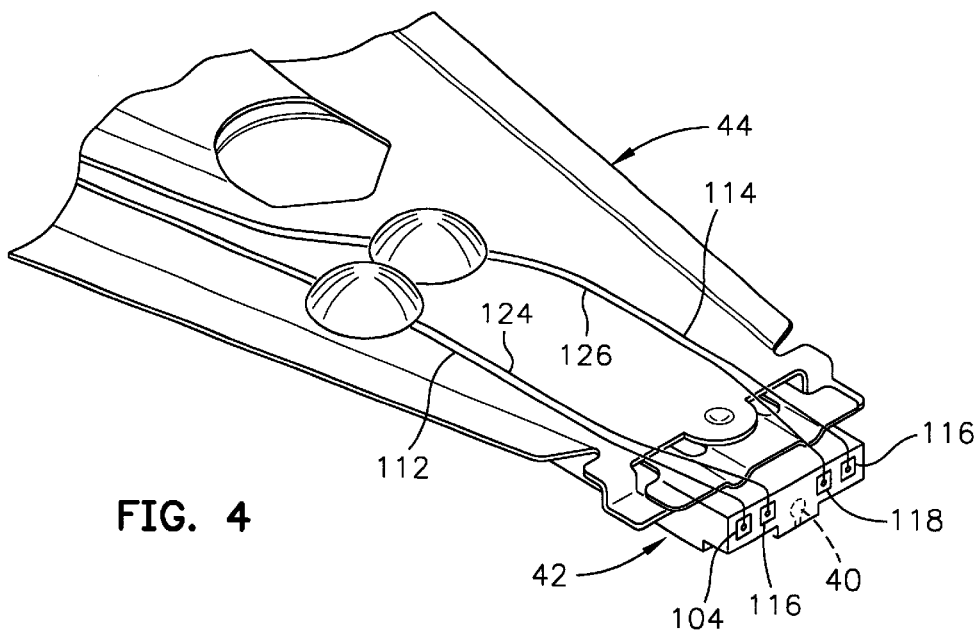
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head assembly 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head assembly 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head assembly 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a suspension 44. The components described hereinabove may be mounted on a frame 54 of a housing, as shown in FIG. 3.

Figure 5:
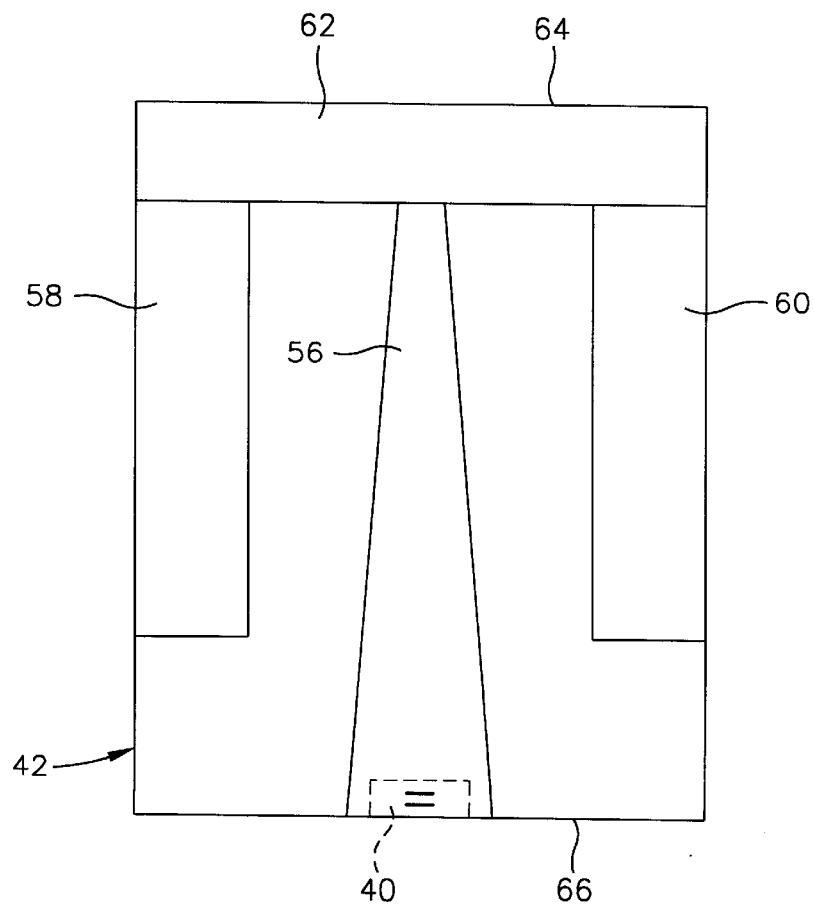
FIG. 5 is an ABS view of the magnetic head taken along plane 5—5 of FIG. 2.

FIG. 5 is an ABS view of the slider 42 and the magnetic head assembly 40. The slider has a center rail 56 that supports the magnetic head assembly 40, and side rails 58 and 60. The rails 56, 58 and 60 extend from a cross rail 62. With respect to rotation of the magnetic disk 34, the cross rail 62 is at a leading edge 64 of the slider and the magnetic head assembly 40 is at a trailing edge 66 of the slider.

Figure 8:
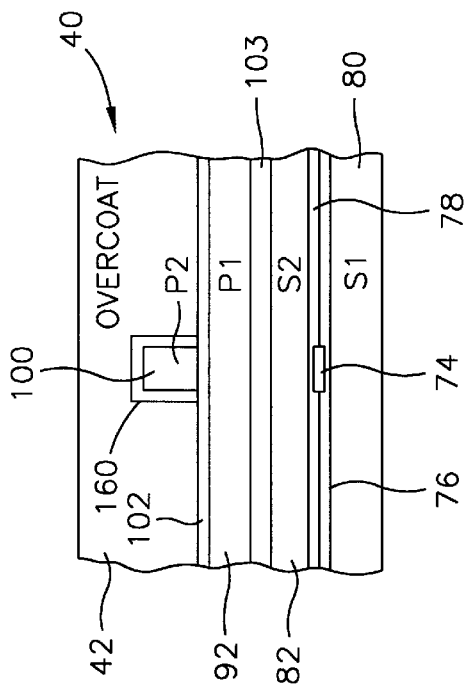
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head assembly 40, which includes a write head portion 70 and a read head portion 72, the read head portion employing a sensor 74, such as a spin valve sensor. FIG. 8 is an ABS view of FIG. 6. The sensor 74 is sandwiched between nonmagnetic nonconductive first and second read gap layers 76 and 78, and the read gap layers are sandwiched between ferromagnetic first and second shield layers 80 and 82. In response to external magnetic fields, the resistance of the sensor 74 changes. A sense current conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and first pole piece layer 92. Since the second shield layer 82 and first pole piece layer 92 are separate layers this head is known as a piggyback head. As shown in FIGS. 2 and 4, first and second studs 104 and 106 connect leads from the sensor 74 to leads 112 and 114 on the suspension 44, and third and fourth studs 116 and 118 connect leads 120 and 122 from the coil 84 (see FIG. 8) to leads 124 and 126 on the suspension.

Figure 9:
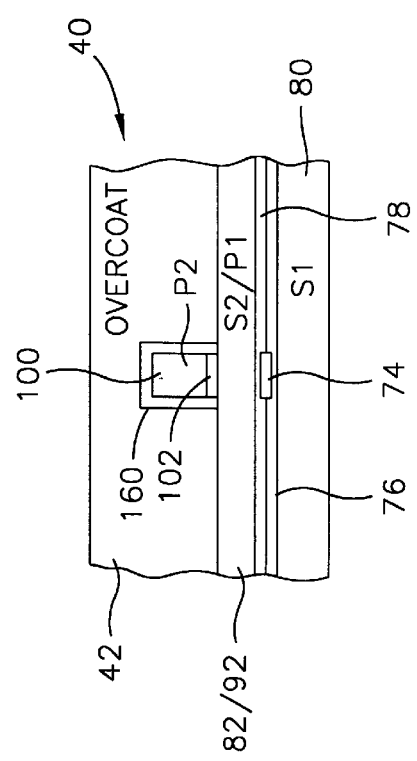
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and first pole piece layer 92 are a common layer. This type of head is known as a merged magnetic head. The insulation layer 103 of the piggyback head in FIGS. 6 and 8 is omitted.

Figure 11:
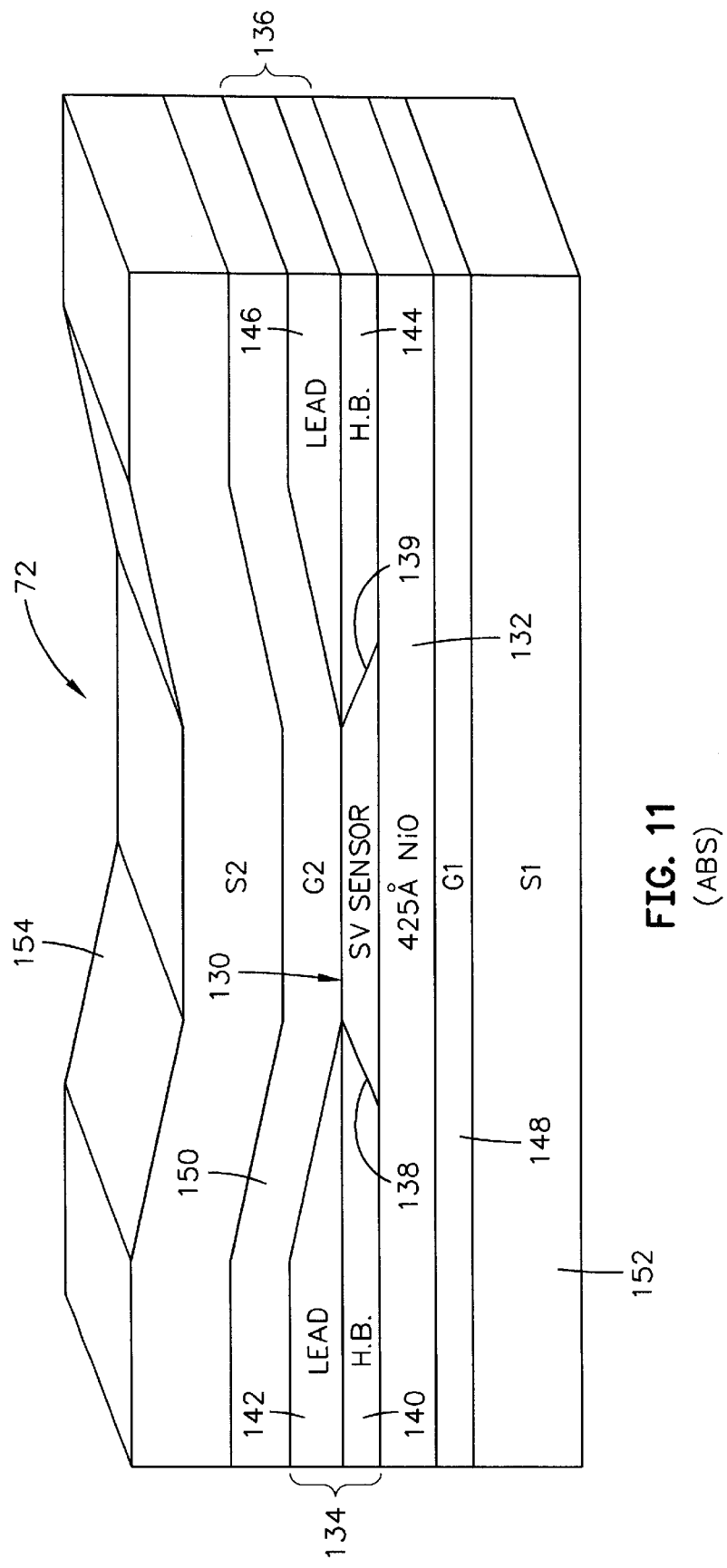
FIG. 11 is an isometric ABS illustration of the read head.

FIG. 11 is an isometric ABS illustration of the read head 72 shown in FIGS. 6 or 8. The read head 72 includes a sensor 130 which may be located on an antiferromagnetic (AFM) pinning layer 132. First and second hard bias and lead layers 134 and 136 are connected to first and second side edges 138 and 139 of the spin valve sensor. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing magnetic domains of a ferromagnetic free layer therein. The AFM pinning layer 132, the spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

The Invention

The invention comprises a dielectric protection layer 160 which covers the top and first and second side walls of the pole tip portion of the second pole piece layer in either of the embodiments of the standard write heads shown in FIGS. 6 and 8 or 7 and 9. The dielectric may be alumina ($Al_2O_3$), silicon dioxide ($Si_2O_3$) with the preferred material being alumina. The protection layer 160 may be formed by sputter deposition with a bilayer photoresist lift-off mask or sputtered over the entire wafer and then unwanted portions removed by protecting the wanted portion 160 with photoresist and then ion milling away the unwanted portions. Alternatively, the protection layer may be sputter deposited over the entire wafer with no portions removed in which case the protection layer would also be located on top of the yoke portion and the back gap portion of the second pole piece layer 94.

Figure 12:
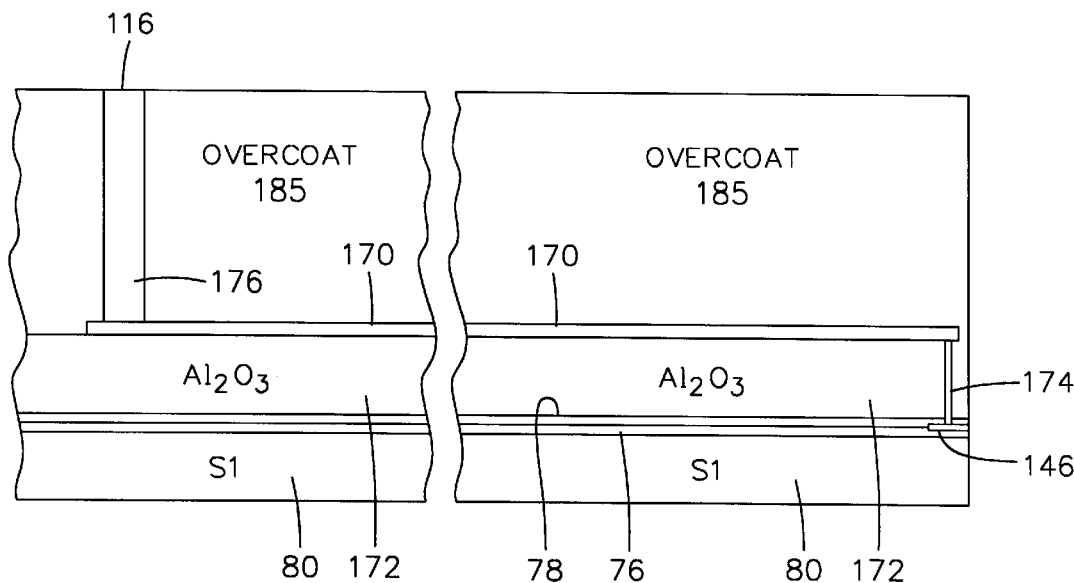
FIG. 12 is a longitudinal cross-section of a field portion of the write head showing connection of a terminal lead and a stud to the read sensor.
Figure 13:
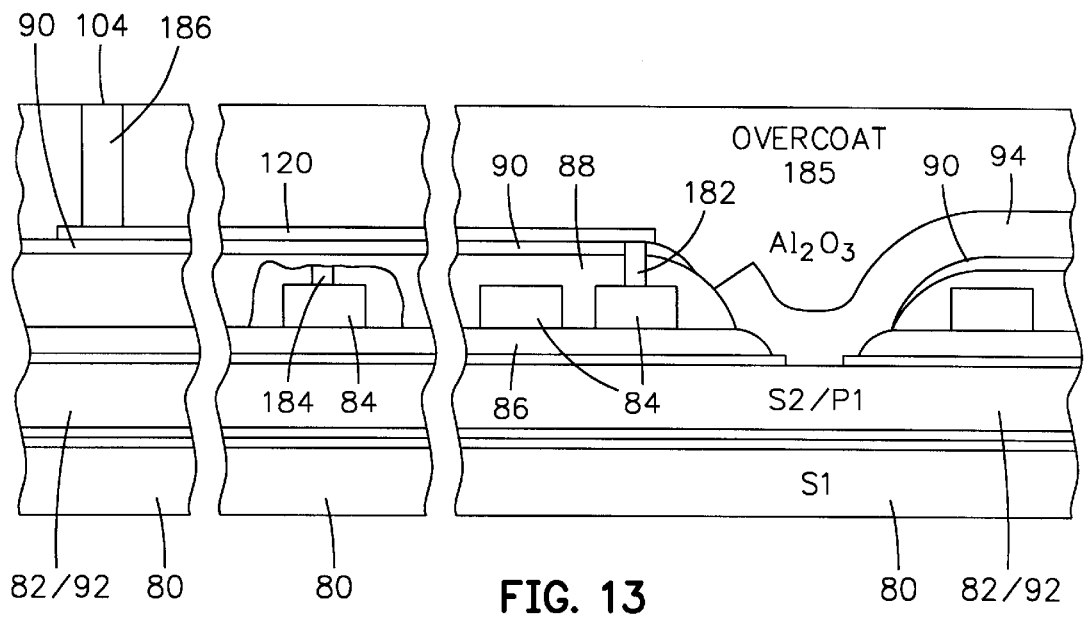
FIG. 13 is a longitudinal cross-section of the write head showing connection of a lead and a stud to the write coil.

In the standard write head the purpose of the protection layer 160 is to prevent alteration of the first and second side walls and top of the second pole tip portion upon subsequently fabricating terminal leads and studs, as shown in FIGS. 12 and 13. FIG. 12 is a longitudinal cross-section of a field region of the magnetic head which is located laterally beyond the coil layer 84, shown in FIG. 10. In the field regions, on each side of the coil layer 84, a terminal lead connection is made to each of the leads 142 and 146 to the sensor 130, shown in FIG. 11. FIG. 12 shows the connection of a terminal lead 170 to the lead 146. Another terminal lead (not shown) is connected to the lead 142 on an opposite side of the coil layer 84. As shown in FIG. 12, an insulation layer, such as alumina ($Al_2O_3$), 172 is located on top of the second read gap layer 78 to the level of the third insulation layer 90 shown in FIG. 7. A via 174 is constructed through the insulation layer 172 to the lead layer 146. This is accomplished by patterning photoresist with an opening where the via is to be located, employing an etchant to etch the via 174 and then electroplating to fill the via. The wafer is then sputter etched in order to clean its surface and a photoresist layer is photopatterned with an opening where the terminal leads, such as terminal lead 170, are to be located. Electroplating is then implemented to plate the terminal leads after which the photoresist layer is removed. The wafer is then ion milled to remove the exposed seed layer portions. The wafer is then sputter etched in preparation for constructing studs, such as the stud 176, which is connected to an opposite end of the terminal lead 170 and is exposed at a surface of the magnetic head assembly at 116, which is also shown in FIG. 2. Another stud (not shown) is connected to the other terminal lead (not shown), which is connected to the other lead 142 of the sensor shown in FIG. 11. After sputter etching the surface of the wafer in order to clean its surface a seed layer of copper (Cu) is sputter deposited on the entire wafer followed by photopatterning the wafer with an opening where the stud 176 is to be located. The stud 176 is then electroplated and the photopattern is removed followed by ion milling of the wafer to remove unwanted portions of the seed layer. The protective dielectric layer 160, shown in FIG. 7 or FIG. 6, prevents alteration of the first and second side walls and top of the pole tip portion of the second pole piece layer during the sputter etching and ion milling steps during fabrication of the terminal leads and studs connected to leads of the sensor.

Figure 10:
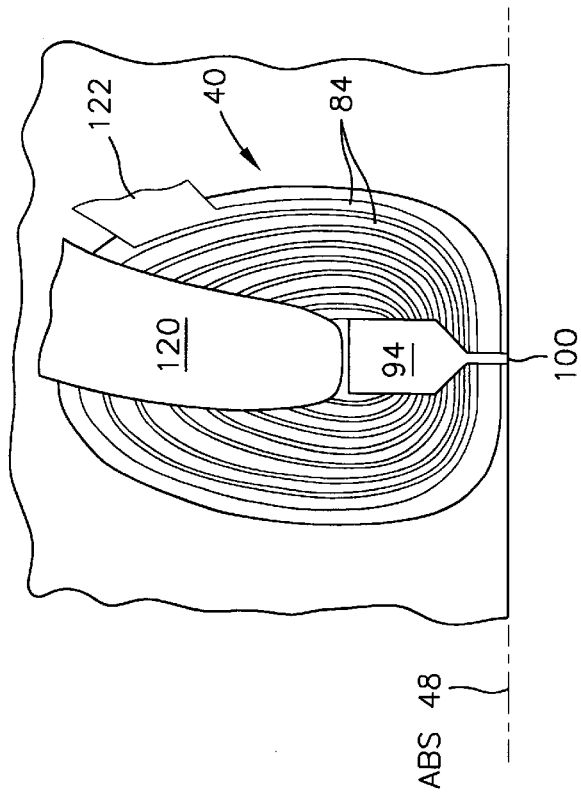
FIG. 10 is a view taken along plane 10—10 of FIGS. 6 or 7 with all material above the coil layer and leads removed.

In FIG. 13 terminal leads, one of which is shown at 120, and studs, one of which is shown at 186, are connected to the coil layer 84 in FIG. 10. The terminal lead 120 is connected to a center tap of the coil layer 84, which is located at the end of the innermost turn of the layer by a via 182. The terminal lead 122, which is shown in FIG. 10, is connected to an outer turn of the coil layer by a via 184. The vias 182 and 184 are formed by patterning a photoresist layer on the wafer with an opening at the location of each via. Electroplating is then implemented to fill the vias with a conductive material, such as copper (Cu). The wafer is then sputter etched to clean its surface and a seed layer (not shown) of copper (Cu) is sputter deposited over the entire wafer. The wafer is then covered with photoresist which is photopatterned with an opening at the locations of the terminal leads, one of the terminal leads being shown at 120 in FIGS. 10 and 13. Copper is then electroplated into the openings forming the terminal leads followed by removal of the photoresist layer and ion milling to remove unwanted portions of the seed layer. The wafer is then sputter etched to clean its surface, a seed layer is sputter deposited over the entire wafer and photoresist is patterned at the locations of the studs, one of the studs being shown at 186 in FIG. 13. The studs are then formed by electroplating followed by removal of the photoresist layer and ion milling to remove unwanted portions of the seed layer. The top of the stud 180 forms the terminal 104 shown in FIG. 2. During the sputter etching and ion milling steps the protective layer 160 protects the first and second side walls and top of the pole tip portion 100 in FIG. 9 from alteration. After completion of the studs, shown in FIGS. 12 and 13, an overcoat layer 185 is deposited, which is also shown in FIGS. 6–9.

Construction of the Standard Write Head

Figure 14A:
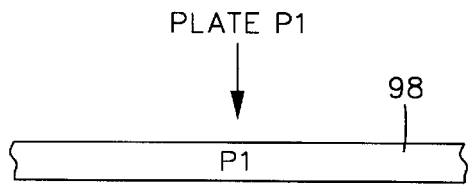
FIGS. 14A–14H illustrate longitudinal cross-sectional views and FIGS. 14I and 14J illustrate ABS views showing the various steps in the fabrication of a write head up to the point of completing the second pole piece layer of a standard write head.
Figure 14B:
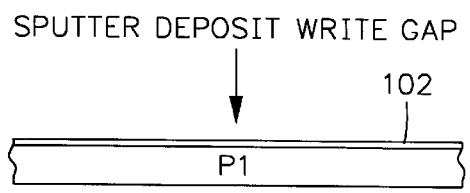
Figure 14C:
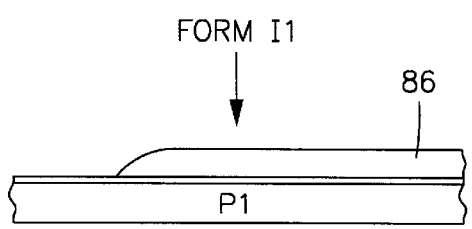
Figure 14D:
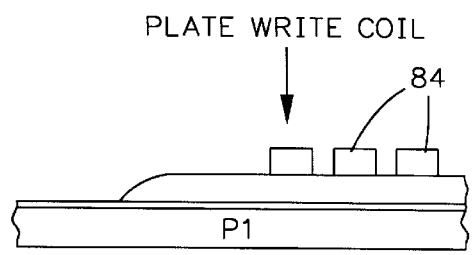
Figure 14E:
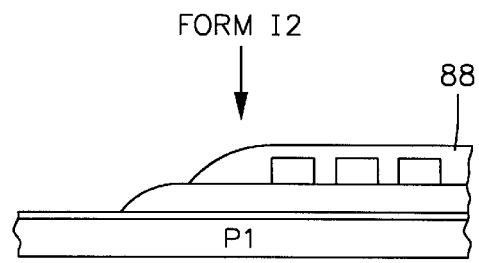
Figure 14F:
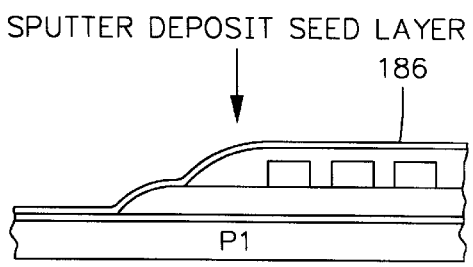
Figure 14G:
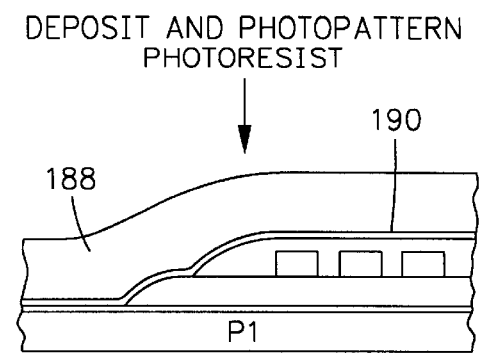
Figure 14H:
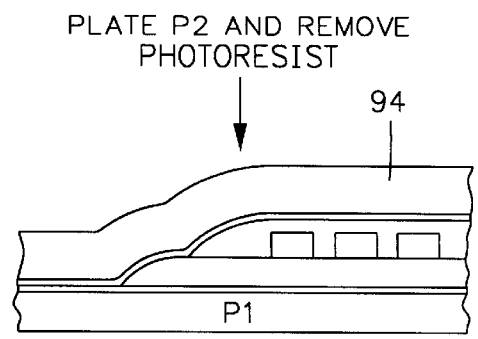
Figure 14I:
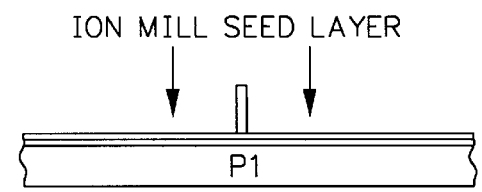
Figure 14J:
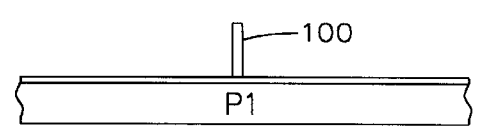

FIGS. 14A–14J show the various steps in the construction of the write head portion of a standard piggyback or merged head, as shown in FIGS. 6 and 7. In FIG. 14A the first pole piece layer 92 is formed by photoresist patterning and electroplating. In FIG. 14B the write gap layer 102 is formed by sputter deposition. In FIG. 14C the first insulation layer 86 is formed by photopatterning a resist layer with a desired shape. In FIG. 14D the entire wafer is sputter etched, a seed layer (not shown) is deposited, a photoresist layer (not shown) is photopatterned with an opening at the location for the write coil 84, the write coil 84 is plated in the opening, the photoresist pattern is removed and the wafer is sputter etched to remove unwanted portions of the seed layer. In FIG. 14E a second insulation layer 88 and, optionally, a third insulation layer 90 are formed by patterned photoresist. In FIG. 14F the wafer is sputter etched to clean its surface and a seed layer 186 is sputter deposited over the entire wafer. In FIG. 14G a photoresist layer 188 is photopatterned with an opening where the second pole piece layer 94 is to be located. In FIG. 14H the second pole piece layer 94 has been electroplated and the photoresist layer removed. In FIG. 14I the entire wafer is ion milled to remove unwanted portions of the seed layer 186 resulting in the finished second pole tip portion 100 shown in FIG. 14J.

Prior Art Fabrication of Terminal Leads and Studs

Figure 15A:
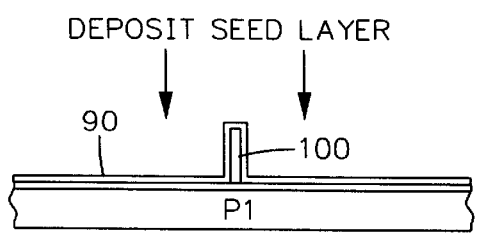
FIGS. 15A–15D are ABS illustrations of the write head in FIG. 14J showing a typical method of fabricating terminal leads and studs after construction of the second pole tip portion along with the second pole piece layer of a standard write head.
Figure 15B:
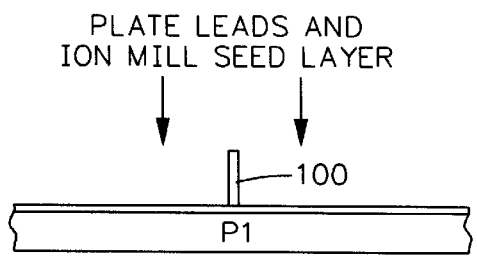
Figure 15C:
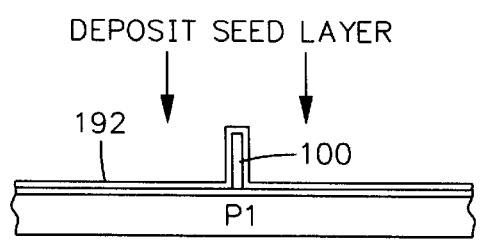
Figure 15D:
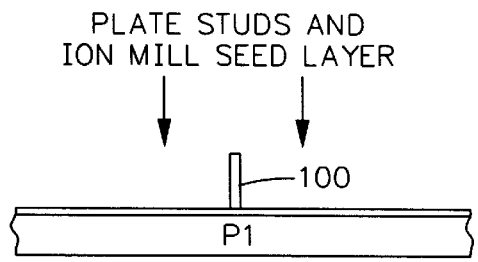

FIGS. 15A–15D show various steps in the construction of terminal leads to leads 142 and 146 (see FIG. 11) from the sensor and terminal leads to the write coil and studs that are connected to the terminal leads. In FIG. 15A, after sputter etching the entire wafer to clean its surface, a copper (Cu) seed layer 190 is deposited over the entire wafer including the top and first and second side walls of the second pole tip portion 100. In FIG. 15B the terminal leads have been formed and unwanted portions of the seed layer 190 have been removed by ion milling. Unfortunately, this ion milling alters the first and second side walls of the pole tip portion 100 thereby reducing its track width. In FIG. 15C the entire wafer is again sputter etched to clean its surface and a copper (Cu) seed layer 192 is sputter deposited over the entire wafer. In FIG. 15D studs are plated and connected to the terminal leads. The seed layer 192 is then removed by ion milling. Unfortunately, the ion milling further removes a portion of the first and second side walls of the second pole tip portion 100 thereby reducing its track width and more thickness from its top. The reduction in track width caused by the sputter etching and the ion milling in FIGS. 15A–15D are unacceptable for submicron track widths.

Figure 16A:
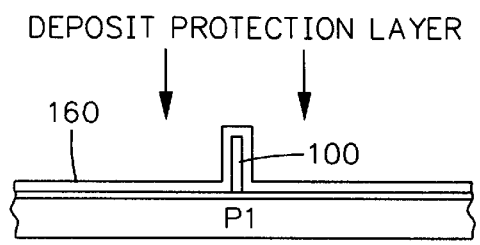
FIGS. 16A–16E are ABS illustrations of the present method of protecting the side walls of the second pole tip portion of the second pole piece layer during fabrication of terminal leads and studs of the standard write head.
Figure 16B:
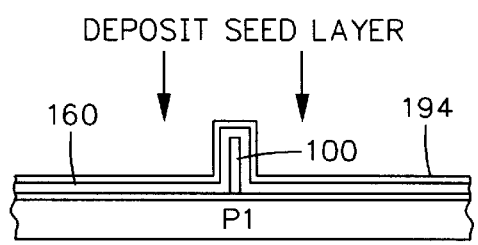
Figure 16C:
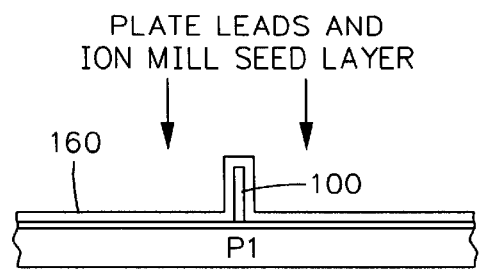
Figure 16D:
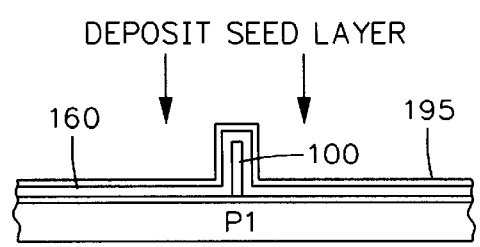
Figure 16E:
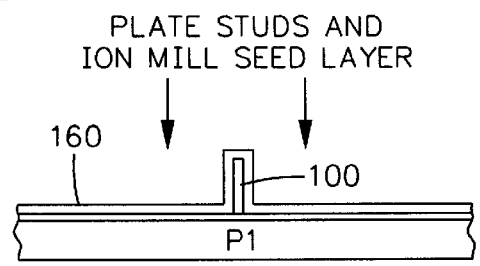

Present Fabrication of Terminal Leads and Studs after Completion of the Second Pole Tip Portion FIGS. 16A–16E illustrate various steps in construction of the terminal leads and studs subsequent to formation of the second pole tip portion 100. In FIG. 16A the dielectric protective layer 160 is sputter deposited over the entire wafer or may be photopatterned to cover only the top and first and second side walls of the pole tip portion 100, as desired. In FIG. 16B the entire wafer is sputter etched followed by sputter depositing a copper (Cu) seed layer 194. In FIG. 16C the wafer is photopatterned, the terminal leads are electroplated, the patterned photoresist is removed and the wafer is ion milled to remove unwanted portions of the seed layer 194. It should be noted that the sputter etching and the ion milling will have no effect on the first and second side walls as well as the top of the second pole tip portion 100 since the side walls are covered by the dielectric protection layer 160. In FIG. 16D the entire wafer is sputter etched to clean its surface and a copper (Cu) seed layer 195 is sputter deposited over the entire wafer. In FIG. 16E the wafer is photopatterned for the studs, the studs are electroplated, the patterned photoresist is removed and ion milling is implemented to remove unwanted portions of the seed layer 195. It should be noted that the sputter etching and the ion milling in the formation of the studs had no effect on the first and second side walls and top of the second pole tip portion 100 because of protection by the dielectric protection layer 160.

Figure 17:
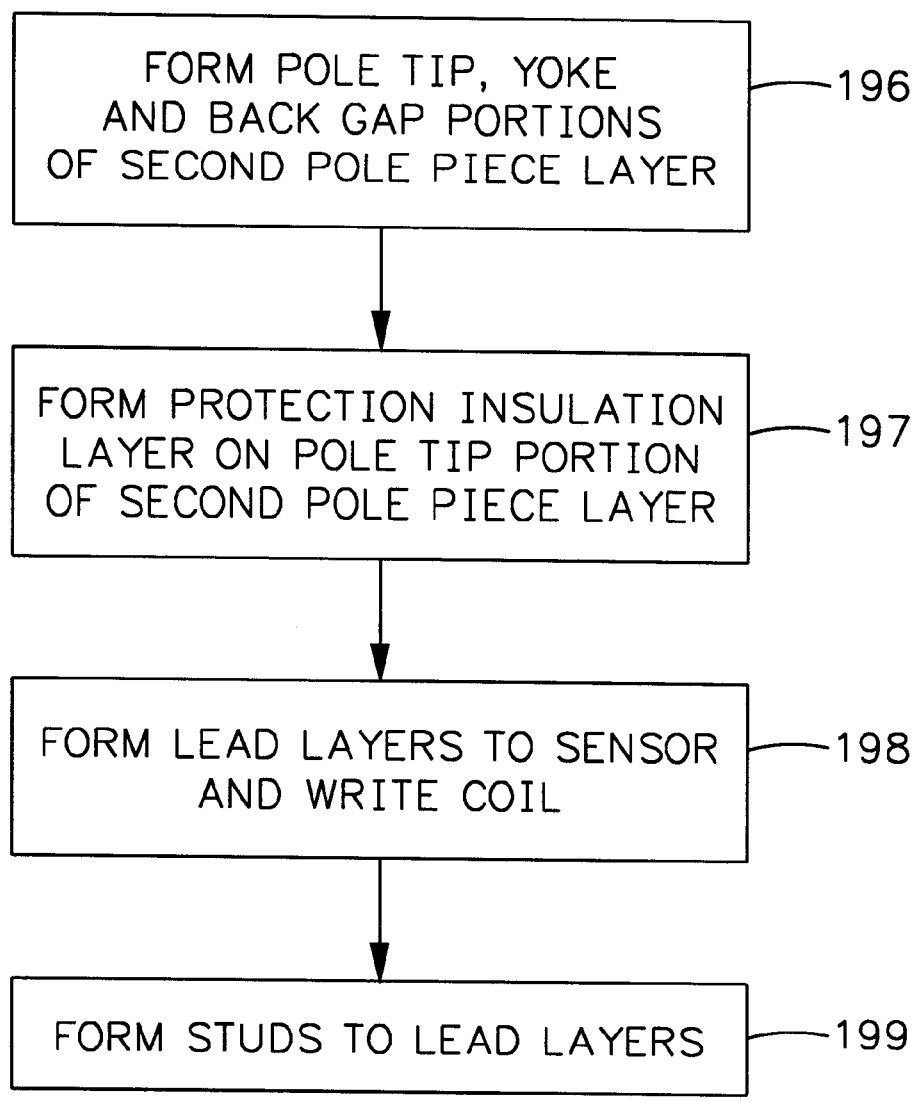
FIG. 17 is a block diagram showing exemplary steps of the present method of construction of the standard write head.

FIG. 17 illustrates in block diagram a broad concept of the invention wherein in block 196 the pole tip, yoke and back gap portions of the second pole piece layer are formed, in block 197 the protection insulation layer 160 is formed on the pole tip portion 100 of the second pole piece layer, in block 198 the terminal lead layers are formed to the sensor and the write coil and in block 199 studs are connected to the terminal leads.

Stitched Write Head

Figure 18:
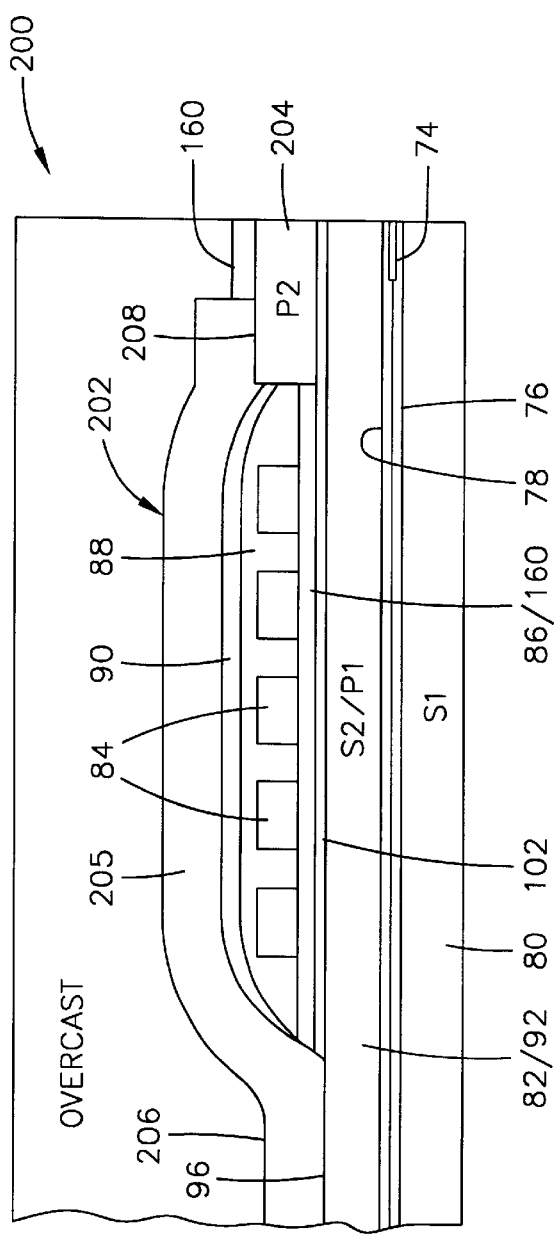
FIG. 18 is a longitudinal cross-sectional view of a stitched write head showing the protective dielectric for the second pole tip portion.
Figure 19:
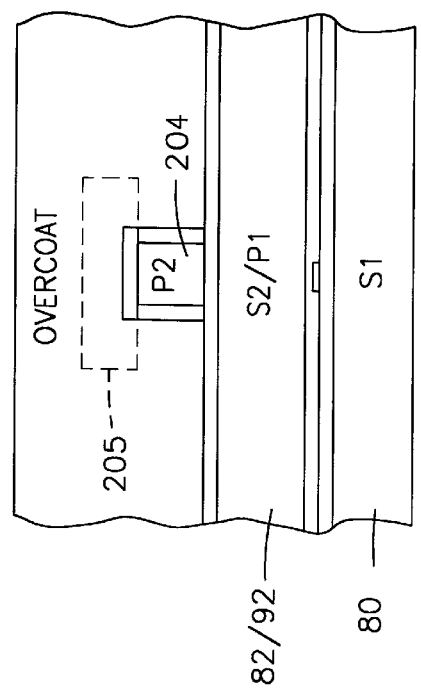
FIG. 19 is a view taken along plane 19—19 of FIG. 18.

FIGS. 18 and 19 show a stitched write head 200. The stitched write head is the same as the standard write head shown in FIG. 7 except the dielectric protection layer 160 is optionally employed as a first insulation layer 86/160 and the second pole piece layer 202 comprises a second pole tip portion 204, a yoke portion 205 and a back gap portion 206. A bottom surface portion of the yoke portion 205 is connected to or stitched to a top surface portion 208 of the second pole tip portion. The dielectric protection layer 160 is preferably photopatterned with an opening through which ion milling can be implemented to remove the portion of the dielectric protection layer on the top surface portion 208. An advantage of the stitched head is that the second pole tip portion 204 may be constructed before constructing the coil layer 84 and the second and third insulation layers 88 and 90 so that photopatterning may be employed for constructing the second pole tip portion 204 without reflective notching from forward sloping portions of the insulation layers 88 and 90. Reflective notching reflects light into the photoresist pattern for the second pole tip which widens the track width of the second pole tip. In a preferred embodiment the write gap layer 102 extends into the yoke region of the write head and the dielectric insulation layer 160 also extends into the yoke region of the head on top of the write gap layer so as to form a first insulation layer for the insulation stack separating the coil layer 84 from the second shield/first pole piece layer 82/92. Since the coil layer 84 is constructed subsequent to the construction of the second pole tip portion 204 the dielectric protection layer 160 will protect the first and second side walls and top of the second pole tip portion 204 from sputter etching and ion milling involved in constructing the write coil layer, as well as the terminal leads to the leads of the MR sensor 74, terminal leads to the write coil layer 84 and studs to the terminal leads, as described hereinabove.

Figure 20:
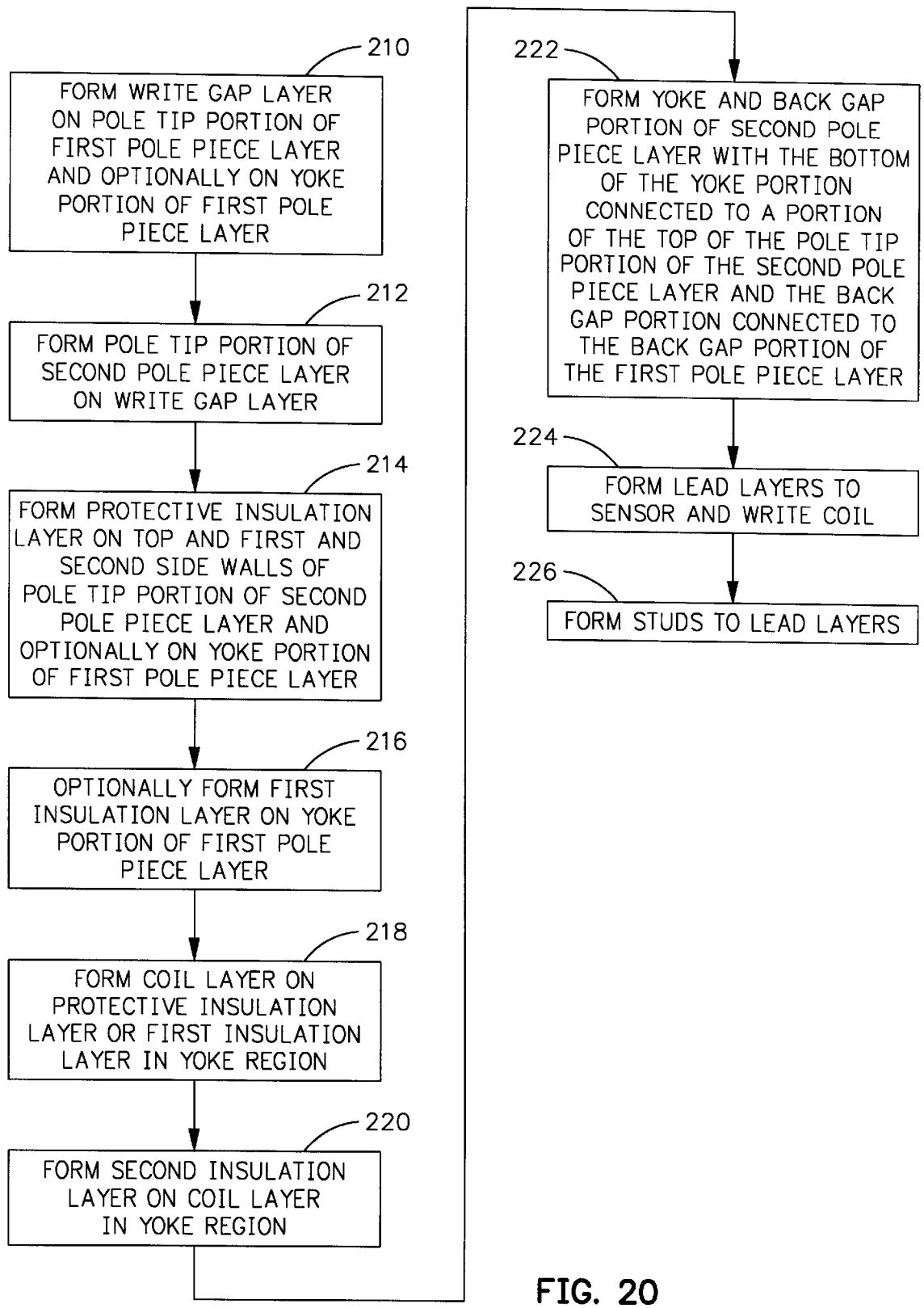
FIG. 20 is a block diagram of exemplary steps for partially constructing the stitched write head shown in FIGS. 18 and 19.

FIG. 20 illustrates in block form the various steps involved in the construction of the stitched write head after formation of the second shield/first pole piece layer 82/92. In block 210 the write gap layer 102 is formed and preferably extends through the pole tip and yoke regions of the write head. In block 212 the second pole tip portion 204 is formed on the write gap layer. In block 214 the protective insulation layer 160 is formed on the top and first and second side walls and top of the pole tip portion 204. In block 216 the protective insulation layer 160 is also preferably deposited in the yoke region of the write head to serve as a first insulation layer. In block 218 the write coil is preferably deposited on the protective insulation layer 160 or, optionally, may be deposited on a photoresist first insulation layer in the yoke region. In block 220 second and third insulation layers are deposited on the write coil layer in the yoke region. In block 222 the yoke 205 and back gap portion 206 of the second pole piece layer is formed with a bottom of the yoke portion connected to a portion of the top of the second pole tip portion 204 and the back gap portion 206 of the second pole piece layer 202 is connected at 96 to a back gap portion of the second shield/first pole piece layer 82/92. In block 224 terminal lead layers are formed to the sensor and the write coil and in block 226 studs are formed in connection with the terminal leads.

Discussion

It should be understood that the stitched write head 200 in FIGS. 18 and 19 may optionally be a piggyback type magnetic head assembly in lieu of a merged type magnetic head assembly. Further, all the embodiments described hereinabove may be applied to the low profile write head described in U.S. Pat. No. 5,621,596, the inset first insulation layer type of write head described in U.S. Ser. No. 09/034,458, and the sunken pole type of magnetic head assembly described in U.S. Ser. No. 08/789,167.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and the accompanying drawings.

I claim:

1. A method of making a magnetic write head having a yoke region that is located between a pole tip region and a back gap region comprising the steps of:

forming a ferromagnetic first pole piece layer in the pole tip, yoke and back gap regions;

forming at least a portion of a nonmagnetic nonconductive write gap layer on the first pole piece layer in the pole tip region;

forming a ferromagnetic second pole tip portion on the write gap layer in the pole tip region with a top and first and second side walls;

forming a nonmagnetic nonconductive protective insulation layer on the top and first and second side walls of the second pole tip portion; and subsequent to forming the protective insulation layer forming metallic components of the write head with the protective insulation layer on said top and said first and second side walls of the second pole tip portion.

2. A method as claimed in claim 1 wherein the forming of the metallic components includes:

forming first and second terminal write lead layers that are connected to a coil layer; and forming first and second studs that are connected to the first and second terminal write lead layers.

3. A method as claimed in claim 1 wherein the forming of the metallic components includes:

forming at least one write coil layer in the yoke region;

forming yoke and back gap portions of the second pole piece layer in the yoke and back gap regions with the yoke portion connected to the second pole tip portion;

forming first and second write terminal lead layers that are connected to the coil layer;

forming first and second studs that are connected to the first and second terminal write lead layers to the coil layer.

4. A method of making a magnetic head assembly that has a write head and a read head, the write head having a yoke region that is located between a pole tip region and a back gap region comprising the steps of:

making the read head as follows:
 forming a ferromagnetic first shield layer;
 forming a nonmagnetic nonconductive first read gap layer on the first shield layer;
 forming a sensor on the first read gap layer with first and second side edges;
 forming first and second read lead layers connected to the first and second side edges of the sensor;
 forming a nonmagnetic nonconductive second read gap layer on the sensor and the first and second read lead layers;

making the write head as follows:
 forming a ferromagnetic first pole piece layer on the second read gap layer in said pole tip, yoke and back gap regions;
 forming a nonmagnetic nonconductive write gap layer with at least a portion of the write gap layer being located on the first pole piece layer in the pole tip region;
 forming a pole tip portion of a ferromagnetic second pole piece layer on the write gap layer in the pole tip region with a top and first and second side edges;
 forming a nonmagnetic nonconductive protective insulation layer with at least a portion of the protective insulation layer covering the top and first and second side edges of the pole tip portion;
 subsequent to forming the protective insulation layer forming metallic components of the write head;
 subsequent to forming the second read gap layer forming a ferromagnetic second shield layer on the second read gap layer;
 forming a nonmagnetic nonconductive isolation layer on the second shield layer;
 the forming of the first pole piece layer forming the first pole piece layer on the isolation layer;
 at the time of forming said at least a portion of the write gap layer forming another portion of the write gap layer on the first pole piece layer in the yoke region;
 at the time of forming said at least a portion of the protective layer forming another portion of the protective layer on said another portion of the write gap layer;
 said forming of metallic components of the write head including forming a write coil layer on said another portion of the protective layer;
 forming a nonmagnetic nonconductive insulation layer on the coil layer;
 forming yoke and back gap portions of the second pole piece layer in the yoke and back gap regions on the insulation layer with a bottom portion of the yoke portion connected to the pole tip portion of the second pole piece layer and the back gap portion connected to the first pole piece layer in the back gap region; and
 the forming of metallic components further including forming first and second terminal read leads to the first and second read lead layers to the sensor and first and second terminal write leads to the write coil layer and forming a stud to each of the first and second terminal read leads and the first and second terminal write leads.

5. A method of making a magnetic write head having a yoke portion which is located between a pole tip portion and a back gap portion comprising the steps of:

forming ferromagnetic first and second pole piece layers that have a yoke portion which is located between the pole tip portion and the back gap portion with the pole tip portion of the second pole tip layer having a top and first and second side walls;

forming a nonmagnetic nonconductive write gap layer;

forming at least a portion of the write gap layer between the pole tip portions of the first and second pole piece layers;

forming first and second nonmagnetic nonconductive insulation layers between yoke portions of the first and second pole piece layers;

forming at least one conductive coil layer between the first and second insulation layers;

connecting the back gap portions of the first and second pole piece layers;

forming a nonconductive nonmagnetic protective insulation layer with at least a portion of the protective insulation layer covering the top and first and second side walls of the pole tip portion of the second pole piece layer; and forming a nonconductive nonmagnetic overcoat layer that covers the protective insulation layer.

6. A method as claimed in claim 5 including forming the protective insulation layer of alumina.

7. A method as claimed in claim 5 including:

the forming of the first insulation layer comprising forming another portion of the protective insulation layer between the yoke portion of the first pole piece layer and the coil layer.

8. A method as claimed in claim 7 including:

the forming of the first insulation layer comprising forming another portion of the write gap layer between the yoke portion of the first pole piece layer and said another portion of the protective insulation layer.

9. A method as claimed in claim 8 forming the protective insulation layer of alumina.

10. A method of making a magnetic head assembly that has a write head and a read head, the write head having a yoke region that is located between a pole tip region and a back gap region comprising the steps of:

making the read head as follows:
 forming a ferromagnetic first shield layer;
 forming a nonmagnetic nonconductive first read gap layer on the first shield layer;
 forming a sensor on the first read gap layer with first and second side edges;
 forming first and second read lead layers connected to the sensor;
 forming a nonmagnetic nonconductive second read gap layer on the sensor and the first and second read lead layers;

making the write head as follows:
 forming a ferromagnetic first pole piece layer on the second read gap layer in said pole tip, yoke and back gap regions;
 forming a nonmagnetic nonconductive write gap layer with at least a portion of the write gap layer being located on the first pole piece layer in the pole tip region;

forming a pole tip portion of a ferromagnetic second pole piece layer on the write gap layer in the pole tip region with a top and first and second side edges;

forming a nonmagnetic nonconductive protective insulation layer with at least a portion of the protective insulation layer covering the top and first and second side edges of the pole tip portion;

subsequent to forming the protective insulation layer forming metallic components of the write head with the protective insulation layer covering said top and said first and second side edges of the pole tip portion.

11. A method as claimed in claim 10 including:

subsequent to forming the second read gap layer forming a ferromagnetic second shield layer on the second read gap layer;

forming a nonmagnetic nonconductive isolation layer on the second shield layer; and the forming of the first pole piece layer forming the first pole piece layer on the isolation layer.

12. A method as claimed in claim 11 wherein the forming of the metallic components includes:

without order forming first and second terminal read leads connected to the first and second read lead layers to the sensor and first and second terminal write leads for connection to a write coil; and forming a stud to each of the first and second terminal read leads and the first and second terminal write leads.

13. A method as claimed in claim 11 including;

after forming the first pole piece layer forming a nonmagnetic nonconductive first insulation layer on the first pole piece layer in the yoke region;

forming a write coil layer on the first insulation layer;

forming a nonmagnetic nonconductive second insulation layer on the write coil layer;

at the time of forming the pole tip portion of the second pole piece layer forming yoke and back gap portions of the second pole piece layer with the yoke portion being on the second insulation layer and the back gap portion connected to the first pole piece layer in the back gap region;

the forming of the metallic components including without order forming first and second terminal read leads connected to the first and second read lead layers to the sensor and first and second terminal write leads connected to the write coil; and the forming of the metallic components further including forming a stud connected to each of the first and second terminal read leads and the first and second write terminal write leads.

14. A method as claimed in claim 11 including:

at the time of forming said at least a portion of the protective layer forming another portion of the protective layer on the first pole piece layer in the yoke region;

said forming of metallic components of the write head including forming a write coil layer on said another portion of the protective layer, forming a nonmagnetic nonconductive insulation layer on the coil layer;

forming yoke and back gap portions of the second pole piece layer in the yoke and back gap regions on the insulation layer with a bottom portion of the yoke portion connected to the pole tip portion of the second pole piece layer and the back gap portion connected to the first pole piece layer in the back gap region; and the forming of metallic components further including forming first and second terminal read leads to the first and second read lead layers to the sensor and first and second terminal write leads to the write coil layer and forming a stud to each of the first and second terminal read leads and the first and second terminal write leads.

* * * * *